United States Patent [19]

Nickerson

[11] Patent Number: 4,786,848
[45] Date of Patent: Nov. 22, 1988

[54] WATER JET TRIM HEAD SIMULATOR

[75] Inventor: Ellery Nickerson, New Durham, N.H.

[73] Assignee: Davidson Textron Inc., Dover, N.H.

[21] Appl. No.: 78,406

[22] Filed: Jul. 27, 1987

[51] Int. Cl.⁴ .............................................. G05B 19/42
[52] U.S. Cl. .................... 318/577; 318/568; 29/404
[58] Field of Search ............... 318/567, 568, 569, 570, 318/576, 577; 29/81 B, 91.7, 91.8, 404; 364/191, 193, 449, 513.5

[56] References Cited

U.S. PATENT DOCUMENTS

| | | | |
|---|---|---|---|
| 3,497,701 | 2/1970 | Dalton | 250/216 |
| 3,498,692 | 3/1970 | Jewitt et al. | 350/96.24 |
| 3,878,983 | 4/1975 | Hamill et al. | 364/193 X |
| 3,911,270 | 10/1975 | Traub | 250/227 |
| 3,936,712 | 2/1976 | Gerber et al. | 318/577 X |
| 4,017,723 | 4/1977 | Fickes | 318/570 |
| 4,107,721 | 8/1978 | Miller | 357/30 |
| 4,109,146 | 8/1978 | Hillman | 250/227 |
| 4,146,924 | 3/1979 | Birk et al. | 364/513 |
| 4,269,052 | 5/1981 | Imai et al. | 29/81 B |
| 4,328,050 | 5/1982 | Ashizawa et al. | 318/577 X |
| 4,402,053 | 8/1983 | Kelley et al. | 364/513 |
| 4,441,020 | 4/1984 | Sakamoto et al. | 318/577 X |
| 4,469,930 | 9/1984 | Takahashi | 364/193 X |
| 4,486,842 | 12/1984 | Hermann | 364/513 |
| 4,605,886 | 8/1986 | Inoue | 318/577 X |
| 4,636,612 | 1/1987 | Cullen | 318/577 X |
| 4,685,054 | 8/1987 | Manninen et al. | 364/191 |

FOREIGN PATENT DOCUMENTS 52-52157  4/1977  Japan ................................ 29/81 B Primary Examiner—Bentsu Ro
Attorney, Agent, or Firm—John C. Evans

[57] ABSTRACT

A water jet trim head simulator has the same configuration and dimensions as a cutting or trim head nozzle on a water jet apparatus for trimming workpiece scrap. The simulator is used to guide a robot arm of the apparatus into various multi-axes trim head positions during a teaching mode of operation of the controller for the apparatus. The simulator includes mounting means for connection to the robot arm. The simulator further includes tracking means including a hollow body connected to a fiber optics bundle for directing light from a source to an objective lens for focusing a spot of light on a premarked trim path point on a master workpiece to establish one of a plurality of spatial points to be taught into the controller. The simulator further includes a feeler gauge for physically positioning the simulator with respect to the workpiece to assist the alignment of the light beam to its focused point on the workpiece.

8 Claims, 2 Drawing Sheets

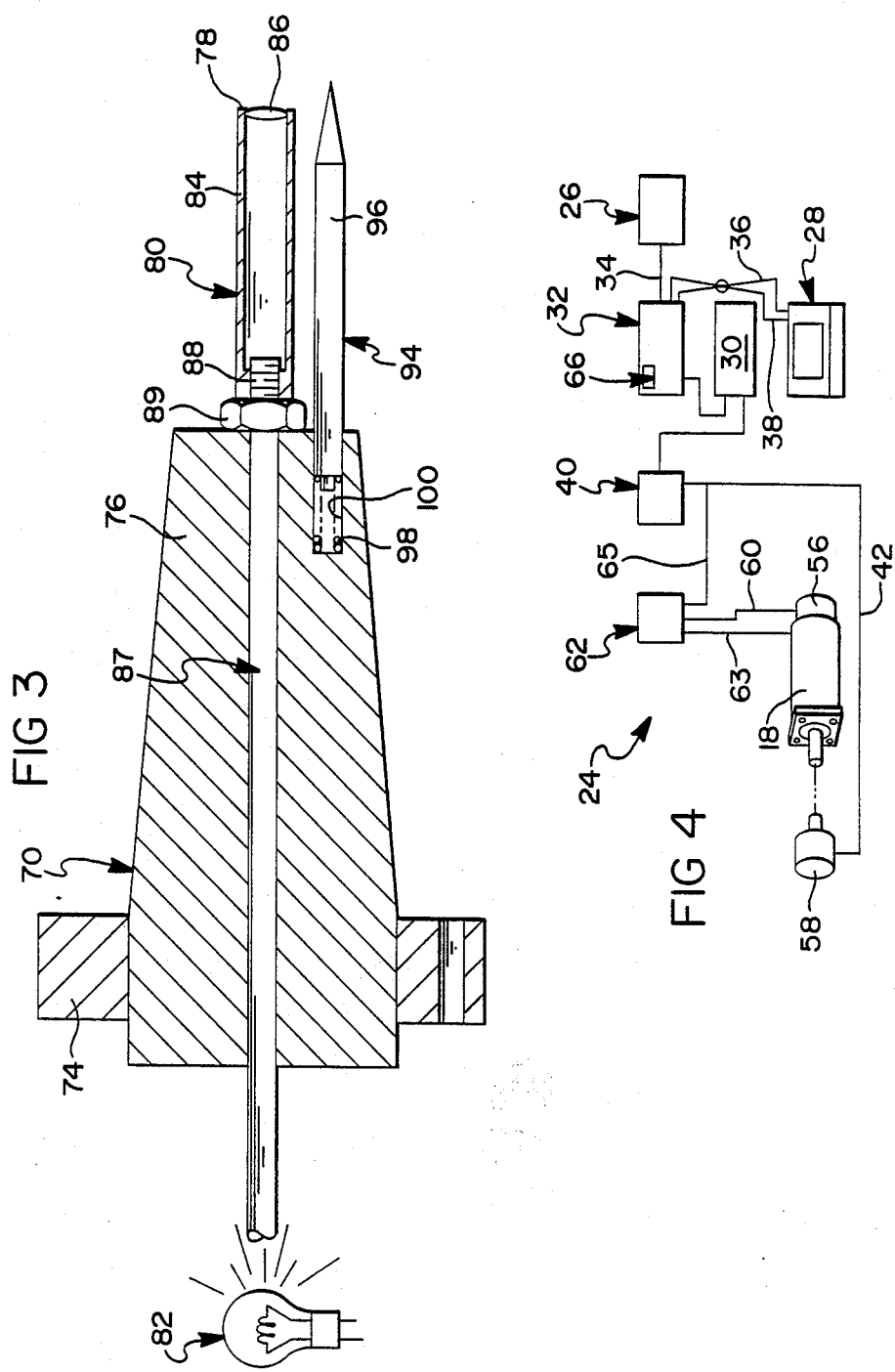

4,786,848

WATER JET TRIM HEAD SIMULATOR

This invention relates to cutting and trimming apparatus and more particularly to noncontact cutting and trimming apparatus having a robot system operated by multi-axes drive means to position a cutting head on a preprogrammed path to direct a cutting beam or stream against a workpiece to trim scrap therefrom.

BACKGROUND OF THE INVENTION

One problem with teachable trim apparatus is that the cutting head of the apparatus must be accurately positioned at a spaced distance from each of a plurality of premarked points on a master workpiece for inputting data from encoder means to program a trim path into the machine controller. The use of an activated cutting head to establish such points can cause operator discomfort, especially in cases where the trim path is defined along an extended complex line or lines which are difficult to access. Such trim paths often occur on large parts such as the instrument panel for an automobile. In such cases the operator must position the activated head with respect to the point to be taught and must also avoid the energy stream which is applied at the point to be taught.

One example of such cutting apparatus is set-forth in U.S. Pat. No. 4,578,554 issued Mar. 25, 1986 for Laser Welding Apparatus. The apparatus includes a minicomputer for controlling the movement of a welding head which has a nozzle for directing the laser beam against the workpiece. There is no suggestion that the work head be replaced by a simulator that includes tracking and feeler means to assure proper placement of the work head of the apparatus at one of a plurality of premarked points on a workpiece for purposes of inputting the controller with axes point data during a teach mode of controller operation.

U.S. Pat. No. 4,146,924 discloses use of light pens to specify a point in a plane and generate a signal for programming robots. In particular the light beam is sensed by a TV camera to program the position of robot fingers for handling devices. It does not teach a cutting head simulator with the same configuration and dimensions of an operative cutting head on apparatus for trimming a workpiece in which tracking means are provided to maintain a desired space between the simulator and the workpiece and to identify a premarked point to be inputted to a machine controller during a teach mode which establishes a programmed path that will position an operating trim head at a desired focused cutting distance with respect to the workpiece as it trims scrap from production workpieces.

U.S. Pat. No. 3,497,701 discloses the use of fiber optics in a pen for developing display programs. Such pens have also been used in machine control as discussed in U.S. Pat. Nos. 3,498,692; 3,911,270 and 4,109,146. These patents, however, do not discuss how the devices might be modified to or made to function as cutting head simulators for conveniently establishing the points at which a multi-axes controller is to be inputted during a teach mode.

U.S. Pat. Nos. 4,107,721; 4,486,842 and 4,402,053 disclose systems for programming a machine by use of light reflection from an object. They do not discuss a device or system to form a cutting head simulator for conveniently establishing the points at which a multi-axes controller is inputted during a teach mode.

STATEMENT OF THE INVENTION AND ADVANTAGES

A feature of the present invention is to provide a cutting head simulator which is dimensioned to correspond to the physical dimensions of a cutting head such as a water jet trim head which is controlled to direct a cutting jet stream against a workpiece to trim scrap from the workpiece along a programmed trim path.

The configured simulator has a hollow body that supports a tracking system including a fiber optic bundle that will direct light through a beam focus tube of a length that corresponds to the length of a water jet nozzle of an operational cutting head. The beam focus tube has a lens that will form a focused light spot on a premarked point along the trim path when the simulator is properly spaced from the workpiece to simulate the desired cutting distance of the operational cutting head when it is performing a programmed trim operation on a production workpiece. The focused light beam also helps locate pre-marked points at which the configured simulator is to be positioned to establish a control location that is inputted to a controller during a teach mode of operation.

The simulator further includes a feeler gauge to assist in locating the focused beam at the proper spaced distance from a premarked point-to-point trim path on a master workpiece mounted on a jig which serves as a reference. The simulator is positioned to place the focused spot at multi-axes positions during the teach mode to both locate the input position on the trim path and to properly space a robot arm and wrist.

Other advantages and a more complete understanding of the invention will be apparent to those skilled in the art from the succeeding detailed description of the invention and the accompanying drawings thereof wherein:

DETAILED DESCRIPTION OF THE DRAWINGS

FIG. 3 is an enlarged longitudinal sectional view of the water jet trim head simulator of FIG. 2; and FIG. 4 is a diagrammatic view of a programmer for the trim apparatus to perform a teach mode in which trim point data is inputted to a central processor unit.

DETAILED DESCRIPTION OF THE INVENTION

Figure 1:
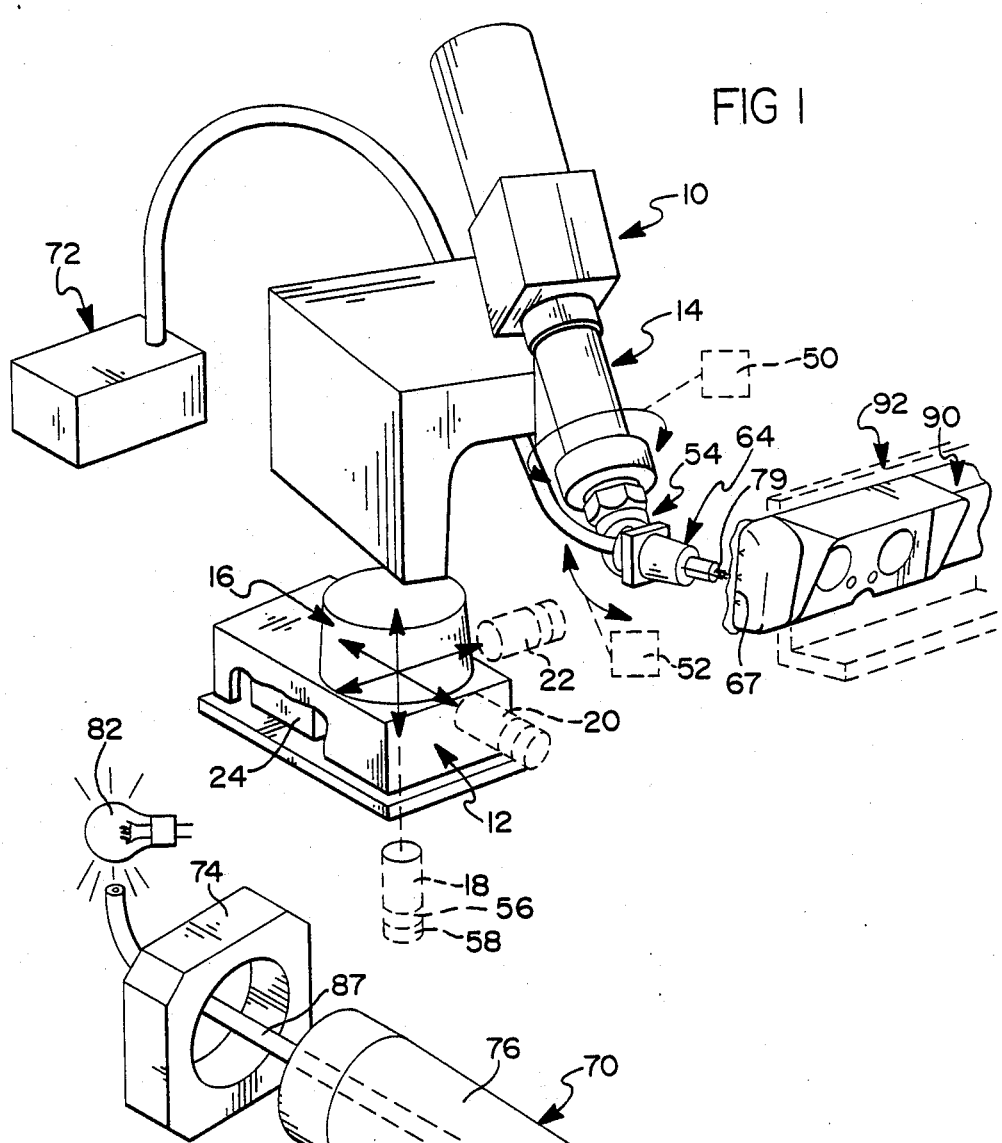
FIG. 1 is a diagrammatic view of a programmable trim apparatus for cutting scrap material from a production workpiece.
Figure 2:
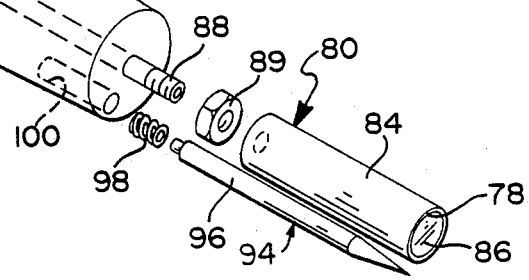
FIG. 2 is an exploded enlarged view of a water jet trim head simulator of the present invention.

Referring now to the attached drawings, FIG. 1 shows a multi-axes type water jet trimming apparatus 10. It includes a base 12 supporting a robot arm 14 driven by a three axes drive system 16 including x, y, and z servomotors 18,20,22. The servomotors are controlled by a machine controller 24 which is diagrammatically shown in FIG. 4 as including a PROM (programmable read only memory) programmer 26, a micro port 28 and a power supply 30.

Serial data is directed from a crt board 32 by data bus 34 to the PROM programmer to store programs that are inputted during a teach mode to be described.

The micro port 28 is connected to the crt board 32 by a video bus 36 and a keyboard data bus 38 to display control information and to input data into the crt board 32 and PROM programmer 26.

A cpu (central processor unit) board 40 receives position data from a bus 42 that carries signals of robot arm position for each of the three axes servomotors 18, 20, 22 as well as the position of 360 degree axes a and b which are driven by servomotors 50, 52 to operate a wrist assembly 54 on the robot arm 14 to produce wrist rotation and wrist bending motions, respectively.

Each of the aforedescribed servomotors has a tachometer 56 and an encoder 58. The tach signals for the tachometers 56 are directed on a bus 60 to a servo amplifier 62 to control motor current on conductor 63. A speed control signal on bus 65 controls the current to the various motors to position a water jet trim head 64 along a desired trim path. The speed signal is established by the cpu board 40 in accordance with parts programs maintained in memory units 66 for parts programs on the crt board 34.

In accordance with the present invention high pressure water is directed to the water jet trim head 64 during machine operation which controls the various servo motors to place the water jet stream along a preprogrammed trim path 67 for each of a variety of workpieces.

In order to assure accurate initial program of each of the category of workpieces the present invention replaces the operational water jet trim head 64 with a water jet trim head simulator 70 which is configured and dimensioned to have the same shape and size as the operational trim head 64. During a teach mode the head simulator 70 replaces the operational head 64 and the apparatus 10 is conditioned so that a high pressure water source 72 is shut-off.

The water jet trim head simulator 70 includes a mounting base 74 and a hollow body 76 which have a combined length and a diameter which are the same as the water jet head. Thus the tip 78 of the simulator 70 corresponds to the tip of the water jet nozzle on an operation water jet trim head. The simulator 70 further includes position tracking system 80 which has a light source 82 and a light focusing tube 84. The light source 80 is a penlight connected to the mounting base 74 and the light focusing tube 84 is an extension of the hollow body 76. An objective lens 86 at the end of the focusing tube 84 receives light from the light source 82 via a fiber optics bundle 87 which is secured to the body 76 by a threaded ferrule 88 and a nut 89.

Since the length and diameter of the simulator 70 are the same as the water jet trim head 64 the fiber optic beam is at the same location as the water jet stream of an operational head. The objective lens 86 focuses a 0.040 inch diameter light image on the trim line at premarked points thereon when the simulator 70 is properly spaced from the workpiece. The light beam also illuminates premarked trim path points which represent the point-to-point trim positions to be inputted to the controller during a teach mode of operation.

In order to program a master workpiece trim pattern, a master, workpiece 90 is placed on a jig 92 for reference the workpiece with respect to the controlled robot arm 14. The technician determines the point-to-point pattern and marks it at point-to-point locations on the master workpiece. They define a trim path which bounds the scrap material to be removed from the workpiece to form a finished workpiece configuration.

The pattern of points is marked on the master workpiece 90 and the technician places the controller 24 in a teach mode. The water jet head simulator 70 traces the focused light beam around the part trim line and the light spot is used to check for reference points on the master workpiece 90 and to locate the robot arm 14 and the wrist 54 at a desired distance from the work piece best suited to produce focused cutting by a water jet stream or other cutting media.

In particular, the teach mode allows the technician to teach robot arm and wrist moves to the apparatus 10 either to create a new program or to modify an existing program in the controller 24.

An Allan Bradley Controller model no. 8400 has the capability of performing the following described teach modes. The technician jogs the various servomotors to position the robot arm 14 and wrist 54 so that the beam of light is sharply focused on one of the selected and marked trim points. A mode select display 94 on the micro port includes a TEACH mode which is selected by a cursor. The cursor is then moved to a TEACH FEEDRATE mode and the desired feed rate is entered by moving the cursor to TEACH and pressing ENTER.

The servomotors are jogged to each subsequently desired reference point and the focused beam spot is placed on the point. The cursor is positioned at TEACH and the ENTER key is pressed. The jogging of motors to position at each premarked point and the selection of TEACH command and the entering process are repeated for each of the marked points on the desired trim line. When all of the desired points have been taught the cursor is moved to a TEACH COMPLETE command on the teach page display and entered. This generates an order to complete the taught program for the referenced master workpiece 90. Block display goes blank to indicate that teaching is complete. The teach mode of the controller 24 is utilized to input positions which are easier to locate and align by virtue of the configuration and function of the simulator 70. The simulator 70 not only helps locate the referenced premarked points on the master workpiece but also enables the technician to receive an eye discernible indication that the simulator 70 is properly spaced from the workpiece when the beam is sharply focused thereagainst. The simulator further includes a spring loaded standoff gage 94 on the body 76. The gage 94 includes a tip 96 connected to a spring 98 that spring loads the tip 96 within a bore 100 which is formed in the end of the hollow body 76. The technician uses the gage 94 to feel the initial location between simulator 70 and workpiece 90. Thereafter eye adjustment of the focused light beam spot establishes the best location for entry of a teach point to input position data to the controller 14.

The use of the simulator 70 enables a program to be tried on a non-operational basis which means that the technician is able to jog and position the robot arm and wrist components on a trial basis. The light on the simulator enables premarked points to be readily discerned in tight and difficult to reach positions on complex workpiece configurations. Furthermore, the teaching mode can be performed without the need for operating the machine so as to direct a cutting stream or beam from the trim apparatus.

While the simulator head is used in place of a water jet trim head it is equally suited for use in other apparatus that includes a cutting head with a cutting beam or stream issuing therefrom such as laser apparatus or other apparatus which do not require cutting blades or tools to cut and trim the scrap from the workpiece.

What is claimed is:

1. In water jet apparatus having a water jet trim head with a nozzle supplied from a high pressure pump means and wherein the nozzle is mounted on a driven member the improvement comprising:
    a head simulator for replacing said water jet trim head during a teach mode of operation including mounting means for connection to the driven member and having a shape and size corresponding to the shape and size of the replaced water jet trim head including the nozzle portion thereof;
    drive means for moving the driven member through a desired trim path;
    tracking means on said head simulator for visually observing the trim path of said head simulator as it is moved along the desired trim path; and
    programmable means responsive to movement of the driven member for preprogramming the water jet apparatus for operating said drive means to position the driven member along multi-axes for directing a water jet from the nozzle head along the desired trim path on a production workpiece being trimmed by the water jet apparatus.

2. In the water jet apparatus of claim 1, said mounting means including a hollow body, and said tracking means including means for directing a light beam from said hollow body against a workpiece.

3. In the water set apparatus of claim 2, said tracking means further including indicator means for establishing a spatial distance between said head simulator and the workpiece as the head simulator is moved with respect to the workpiece to input said programmable means.

4. In the water jet apparatus of claim 3, said indicator means including means for focusing a light beam to form a predetermined eye discernible, focused, spot image on the workpiece when a desired spatial distance is established between the head simulator and the workpiece.

5. In the water jet apparatus of claim 4, further including a gage means on said hollow body for feeling the position of said hollow body with respect to the workpiece for positioning said tracking means into proximate visually tracked relationship with the workpiece.

6. In the water jet apparatus of claim 1, said tracking means further including indicator means for establishing the spatial distance between said head simulator and the workpiece as said head simulator is moved with respect to the workpiece to input said programmable means.

7. In the water jet apparatus of claim 6, said indicator means including means for focusing a light beam to form a predetermined spot image on the workpiece when a desired spatial distance is established between said head simulator and the workpiece during a teach mode of operation.

8. In the water jet apparatus of claim 7, said mounting means including a hollow body, a gage means on said hollow body for feeling the position of said hollow body with respect to the workpiece for positioning said tracking means into proximate visually tracked relationship with the workpiece.

* * * * *